No. 724,089. PATENTED MAR. 31, 1903.
T. A. EDISON.
MEANS FOR OPERATING MOTORS IN DUST LADEN ATMOSPHERES.
APPLICATION FILED JAN. 9, 1903.
NO MODEL.
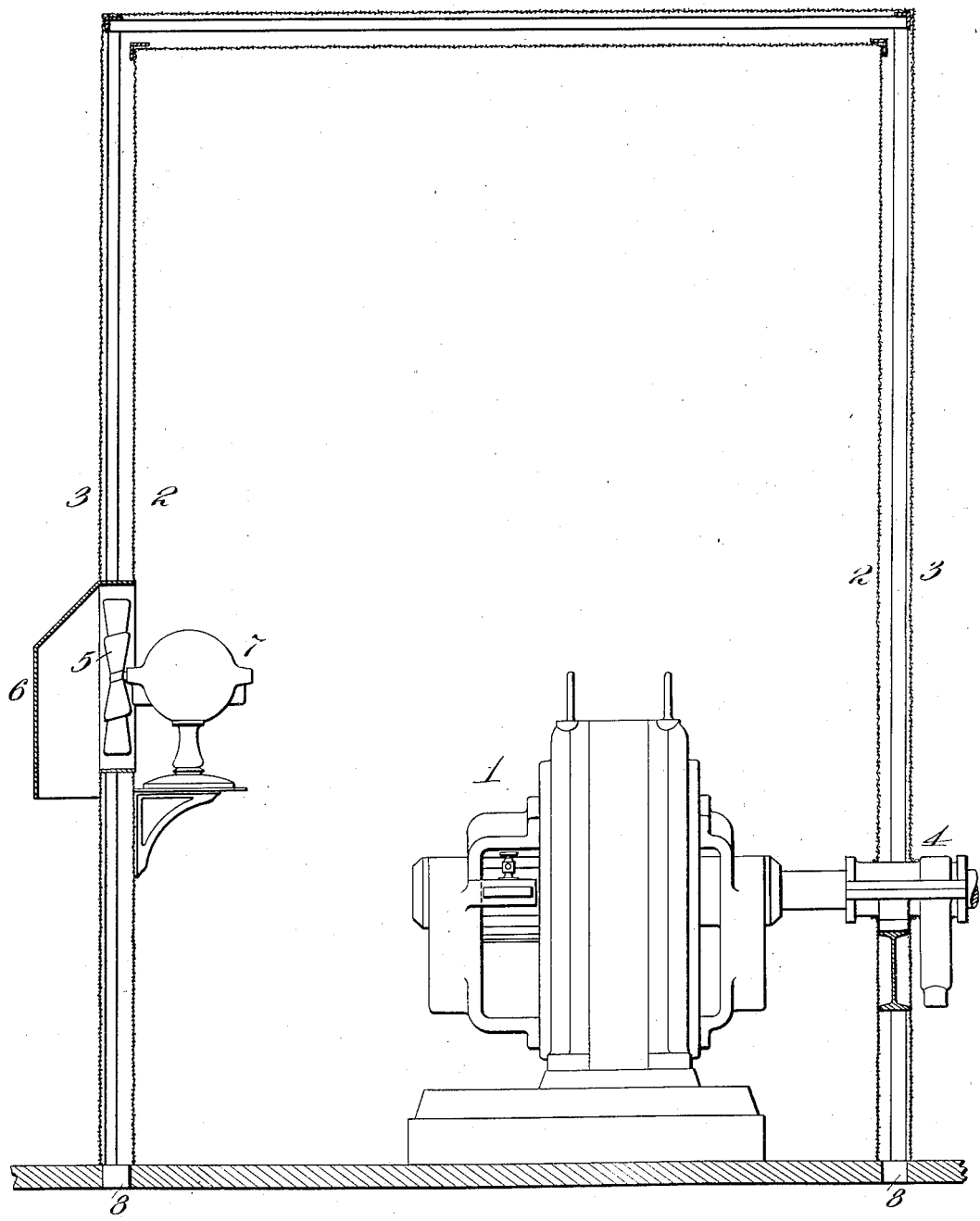
Witnesses:
Jas. F. Coleman
Jno. Robt Taylor
Inventor
Thomas A Edison
by Dyer Edmonds & Dyer
Attorneys

UNITED STATES PATENT OFFICE.

THOMAS A. EDISON, OF LLEWELLYN PARK, NEW JERSEY.

MEANS FOR OPERATING MOTORS IN DUST-LADEN ATMOSPHERES.

SPECIFICATION forming part of Letters Patent No. 724,089, dated March 31, 1903.

Application filed January 9, 1903. Serial No. 138,430. (No model.)

*To all whom it may concern:*

Be it known that I, THOMAS A. EDISON, a citizen of the United States, residing at Llewellyn Park, Orange, in the county of Essex and State of New Jersey, have invented a certain new and useful Improvement in Means for Operating Motors in Dust-Laden Atmospheres, of which the following is a description.

In the operation of electric motors of various sorts in atmospheres which are heavily charged with dust—as in cement-grinding establishments, flour-mills, &c.—great care has to be exercised to protect the bearings and moving parts from the effect of the dust and particularly when the latter is of a hard gritty nature. This has been generally accomplished by the use of so-called "dust-proof" motors; but these are unsatisfactory and in time become seriously impaired, besides being relatively expensive. Furthermore, the closing in of the armature, commutator, and brushes to make them dust-proof interferes with the proper and desirable ventilation of the motors, which therefore become objectionably heated, and hence operate inefficiently. As a matter of fact the so-called "dust-proof" motors have only about one-half the efficiency per unit of weight of a properly-designed open or non-dust-proof motor.

By the present invention I am enabled to operate electric motors of the open type in atmospheres however heavily they may be charged with dust with the best efficiency at all times and with the complete exclusion of dust from all moving parts.

To this end the invention consists in protecting the entire motor with a light casing formed for the most part of a porous textile material, so as to act practically as a dust-sieve, permitting the passage of air through its meshes, but excluding dust, and this casing is preferably, though not necessarily, constructed with double walls, so as to better serve its purpose, as will be explained. I further provide the chamber with an outlet in which is placed an electric-motor fan, blowing air out of the chamber, such air being received through the textile walls of the chamber and freed from dust.

In order that the invention may be better understood, attention is directed to the accompanying drawing, forming a part of this specification, and in which I show an electric motor with a protecting double-walled casing and a ventilating-fan, illustrating the invention in its most approved form.

Entirely surrounding the motor 1 is a dust-proof casing formed, preferably, of an inner wall 2 and an outer wall 3, although a single-walled casing can be employed. The casing is composed of a light framework covered with textile material, preferably ordinary gunny-cloth. Where the motor-shaft passes through the casing, a packed bearing 4 is provided to exclude dust at that point.

5 is a fan arranged within an opening in the casing and effecting an outward draft from the same. A shield 6 is preferably arranged to direct the blast laterally, preventing objectionable air-currents in the dust-laden atmosphere, and more especially preventing an inward flow of air around the fan to thereby carry dust within the casing. The fan is operated in any suitable way, either from the motor 1 or by means of a small auxiliary motor 7. When a double-walled casing is used, openings 8 are preferably formed in the floor to permit of the escape of any dust which may pass through the outer wall 3.

In operation the textile walls of the casing permit air to pass through them, but exclude dust, which adheres to the material and can be shaken off from time to time. The fan 5 results in a constant circulation of air from the casing, fresh air entering through the textile walls, and in consequence the motor will be always kept perfectly cool, and hence will operate with the best efficiency. Of course the area of the textile walls should be proportioned to permit sufficient air to pass through the same to admit of the desired covering effect. In actual practice I have secured excellent results with a five-horse-power electric motor by inclosing it in a casing four feet wide, four feet long, and six feet high on its interior, the outer wall being spaced two inches all around from the inner wall. Motors of greater power will require increased area of chamber.

Having now described my invention, what I claim as new, and desire to secure by Letters Patent, is as follows:

1. The combination with an electric motor to be protected from the effect of dust, of a casing inclosing the same and provided with walls of textile material, substantially as set forth.

2. The combination with an electric motor to be protected from the effect of dust, of a casing inclosing the same and provided with double walls of textile material, substantially as set forth.

3. The combination with an electric motor to be protected from the effect of dust, of a casing inclosing the same and provided with walls of textile material, and a fan for expelling air from said casing, substantially as set forth.

4. The combination with an electric motor to be protected from the effect of dust, of a casing inclosing the same and provided with double walls of textile material, and a fan for expelling air from said casing, substantially as set forth.

5. The combination with an electric motor to be protected from the effect of dust, of a casing inclosing the same and provided with walls of textile material, a fan for expelling air from said casing, and a shield arranged over the exit-opening for laterally deflecting the blast from said fan, substantially as set forth.

6. The combination with an electric motor to be protected from the effect of dust, of a casing inclosing the same and provided with walls of textile material, a fan for expelling air from said casing, and an auxiliary motor for operating said fan, substantially as set forth.

7. The combination with an electric motor to be protected from the effect of dust, of a casing inclosing the same and provided with double walls of textile material, and outlets from the space between the double walls, substantially as set forth.

8. The combination with an electric motor to be protected from the effect of dust, of a casing inclosing the same and provided with walls of textile material, and a dust-proof bearing in the casing through which extends a shaft from the motor, substantially as set forth.

This specification signed and witnessed this 18th day of December, 1902.

THOMAS A. EDISON.

Witnesses:
FRANK L. DYER,
JNO. ROBT. TAYLOR.